United States Patent [19]

Thompson

[11] Patent Number: 4,638,566
[45] Date of Patent: Jan. 27, 1987

[54] HOLE ANGULARITY GAUGE

[75] Inventor: Douglas Thompson, Redmond, Wash.

[73] Assignee: The Boeing Company, Seattle, Wash.

[21] Appl. No.: 716,663

[22] Filed: Mar. 27, 1985

[51] Int. Cl.$^4$ ............................................. G01B 5/24
[52] U.S. Cl. ....................................... 33/534; 33/1 N
[58] Field of Search ................ 33/534, 535, 536, 537, 33/538, 509, 510, 531, 542, 1 N

[56] References Cited

U.S. PATENT DOCUMENTS

| | | | |
|---|---|---|---|
| 1,852,760 | 4/1932 | Sisson. | |
| 1,890,607 | 12/1932 | Hite. | |
| 1,965,131 | 7/1934 | Simpson | 33/174 |
| 2,134,262 | 10/1938 | Phillips | 33/178 |
| 2,527,758 | 10/1950 | Oslund | 33/75 |
| 2,546,532 | 3/1951 | Wade | 33/75 |
| 2,706,338 | 4/1955 | Ackerman et al. | 33/174 |
| 2,714,256 | 8/1955 | Watson | 33/174 |
| 2,787,865 | 4/1957 | Gross | 51/34 |
| 3,109,243 | 11/1963 | McCormick | 33/542 |
| 3,114,978 | 12/1963 | Porter | 33/174 |
| 3,162,953 | 12/1964 | Porter | 33/174 |
| 3,206,858 | 9/1965 | Bernard | 33/534 |
| 4,200,987 | 5/1980 | Schmitt | 33/178 |
| 4,219,936 | 9/1980 | Bridges | 33/534 |
| 4,486,954 | 12/1984 | Mock | 33/534 |

Primary Examiner—Charles Frankfort
Assistant Examiner—Patrick R. Scanlon
Attorney, Agent, or Firm—Joan H. Pauly

[57] ABSTRACT

Improvements in hole angularity gauges. Known gauges require a plug to fit precisely into the hole, or have limited accuracy and/or require multiple readings. The gauge (10) of the invention provides a tapered plug (16) that will fit snugly into holes having diameters varying from a standard within reasonable tolerances. An indicator member (42) is slidably and pivotably attached to a slider member (56) carried by member (12, 14) of which plug (16) is a part. Spring (80) biases member (42) into contact with an object (2) around the hole being tested when plug (16) is wedged into such hole. Member (42) has two spaced legs (46) having rounded bottom ends (48) that contact object (2), and an indicator arm (52) which extends up through a sleeve portion (14) of member (12, 14). When the head (54) of arm (52) protrudes from a radial slot (36) in sleeve (14), the hole being tested deviates from normal to the surface of the object (2) by more than the permissible amount.

17 Claims, 8 Drawing Figures

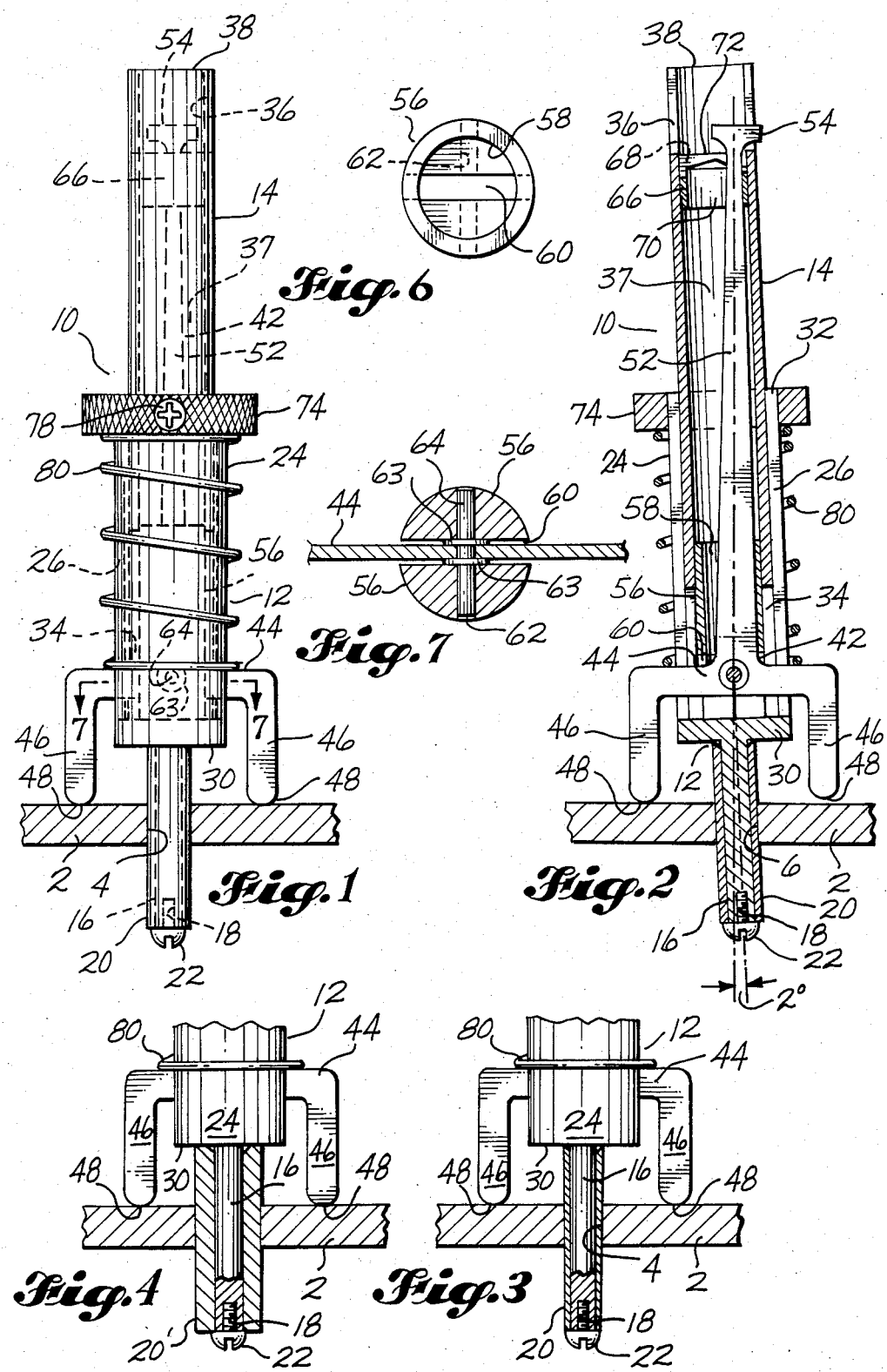

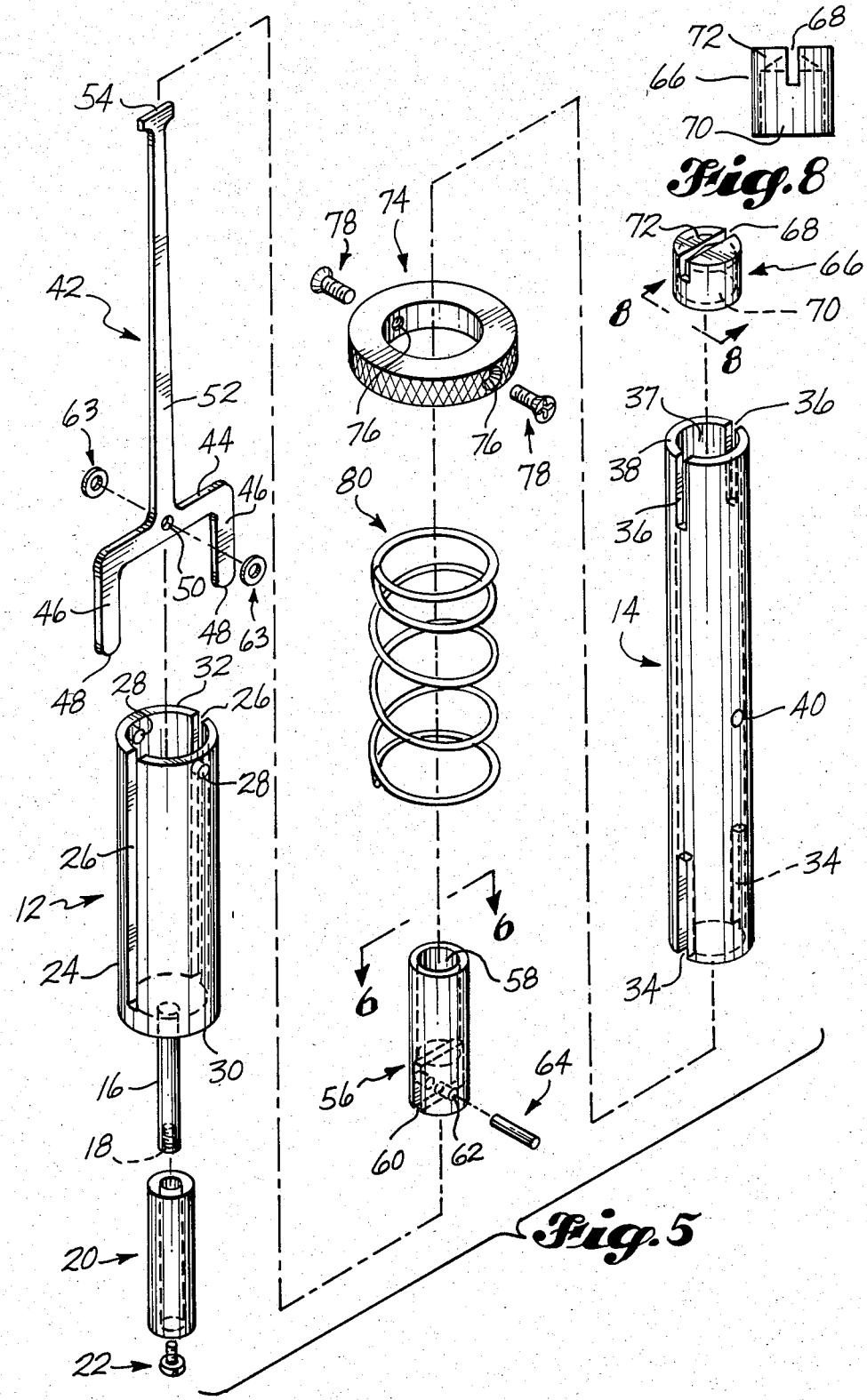

HOLE ANGULARITY GAUGE

TECHNICAL FIELD

This invention relates to gauges for measuring the angles of holes and, more particularly, to such a gauge that has a tapered plug for snugly fitting into holes that vary in size and a member for engaging a surface around the hole which member is axially slidable relative to the plug and is biased towards such surface.

BACKGROUND ART

In many situations, including the manufacture of aircraft, the angle of a fastener hole relative to the surface through which it extends is required to be within very close tolerances. For example, such holes in aircraft are generally required to be within two degrees of normal to the surface. Thus, during the manufacturing process it is necessary to check each hole to ensure that it is within the allowed tolerance.

There are a number of known methods and devices for measuring the angularity of such fastener holes. One method is to insert a pin into the hole and to use a protractor to measure the angle. This method has the disadvantage of requiring the pin to be precisely dimensioned to the hole so that it will fit tightly in the hole. If the pin is too small, the fit will not be tight and the measurement will be inaccurate; if the pin is too large, it will not fit into the hole. The method also has the disadvantages of being fairly awkward to carry out and of requiring two separate tools: the pin and the protractor.

Another method is to insert a fastener into the hole and then to use shims or feelers under the head of the fastener to evaluate the fit. This method also has the disadvantages of requiring a tight fit between the hole and the fastener, of being awkward to carry out, and of requiring more than one tool. In addition, this second method requires experience in evaluating the degree of angularity that exists.

The known gauges for measuring hole angularity are numerous and include gauges for a variety of special purposes. Some of the known gauges include a plug that is precisely dimensioned to the hole for tightly engaging the hole. This type of gauge does not function well if the hole varies in size sufficiently to make the fit between the plug and the hole loose or to prevent insertion of the plug into the hole. Other known gauges include a member that makes linear contact with a sidewall portion of the hole. Such gauges do not provide accurate readings if there is any significant variation in the angularity of the sidewall of the hole around the circumference of the hole. This drawback can be partially compensated for by taking a number of readings at different points around the circumference. However, such a procedure makes the measuring of the angularity an unreasonably long process. Another type of known gauge is one in which there are two or more point contacts between a member that is inserted into the hole and the sidewall of the hole. This type of gauge also has the disadvantage of being subject to inaccurate readings because of variations in the angularity around the circumference of the hole.

Hole angularity gauges are disclosed in U.S. Pat. Nos.: 1,852,760, granted Apr. 5, 1932, to J. G. Sisson; 1,890,607, granted Dec. 13, 1932, to S. V. Hite; 1,965,131, granted July 3, 1934, to R. J. O. Simpson; 2,134,262, granted Oct. 25, 1938, to H. J. Phillips; 2,527,758, granted Oct. 31, 1950, to J. E. Oslund; 2,714,256, granted Aug. 2, 1955, to L. J. Watson; 2,706,338, granted Apr. 19, 1955, to C. Ackerman et al; 3,114,978, granted Dec. 24, 1963, to E. Porter; and 3,162,953, granted Dec. 29, 1964, to E. Porter. The gauges disclosed by Sisson, Simpson, and Oslund are of the type that make linear contact with the hole sidewall. The gauges disclosed by Hite, Phillips, Watson, and Ackerman et al make contact with the hole sidewall at two or more points. The gauges disclosed in the two Porter patents include a precisely dimensioned plug for fitting into the hole. The diameter of the plug is adjustable in some of the embodiments disclosed by Porter. The gauges in each of the above-cited patents, except Hite and Phillips, include a member that fits into the hole and that is pivotably attached to another member that engages a surface around the hole. In the gauges disclosed by Sisson, Simpson, Phillips, Watson, and Ackerman et al, the pivoting of the sidewall engaging member is spring biased to bring the member into contact with the sidewall. The Porter gauges include spaced apart legs, rather than a flat surface, for engaging an object around a hole therein to accommodate a flat or a curved surface.

U.S. Pat. No. 2,546,532, granted Mar. 27, 1951, to J. B. Wade discloses a protractor-type gauge for measuring the tangential angle of the outer portions of the impeller vanes of a centrifugal impeller pump. U.S. Pat. No. 2,787,865, granted Apr. 9, 1957, to M. J. Gross discloses a device for honing a bore and for indicating when the desired diameter of the bore has been reached. When the diameter of the hole is large enough, a downwardly biased sleeve that is carried by the honing mechanism enters the bore and triggers a switch to indicate that the honing operation is complete. The sleeve pivots to automatically adjust to the angle of the bore. U.S. Pat. No. 4,200,987, granted May 6, 1980, to M. G. Schmitt discloses a gauge that apparently measures the diameter only of a hole and that fits fairly closely in the hole but makes contact at two points only.

The above patents and the prior art that is discussed and/or cited therein should be studied for the purpose of putting the present invention into proper perspective relative the prior art.

DISCLOSURE OF THE INVENTION

The subject of this invention is a gauge for measuring the angle of a hole in an object. According to an aspect of the invention, the gauge comprises first and second members that are slidably and pivotably attached. Each of the members has an upper portion and a lower portion. The lower portion of the first member includes a downwardly tapered plug dimensioned to be snugly receivable into the hole. The lower portion of the second member is positioned radially outwardly from the plug and has end surface means. The first member has a use position in which the plug is snugly received into the hole, and the second member has a use position in which the end surface means contacts a surface of the object around the hole. The gauge has means for attaching the members together, to slide with respect to each other along a line toward and away from such use positions and to pivot with respect to each other about a pivot axis perpendicular to such line. Spring means is provided for biasing one of the members downwardly into its use position when the other member is placed into the other member's use position. Indicator means is carried by the upper portions of the members for indicating the angle of the hole relative to the surface of the object.

According to a preferred aspect of the invention, one of the upper portions comprises a tubular portion that defines a slideway. The attaching means that attaches the members together comprises a slider member slidably received into this slideway. The other of the upper portions is pivotably attached to the slider member to slide along and pivot in the slideway.

The preferred embodiment of the indicator means comprises a radial slot extending through the tubular portion and a radially extending head formed on the upper end of the other upper portion. This head is axially and circumferentially aligned with the slot. The tubular portion, other upper portion, slot, and head are dimensioned and positioned so that a part of the head protrudes radially from the tubular portion through the slot when the angle of the hole deviates from a given value by more than a predetermined amount.

A preferred feature of the invention is a slider member which has an annular portion that defines an axial passageway. Said other upper portion extends upwardly from the pivot axis through the passageway. Said other upper portion and the passageway are dimensioned to provide clearance therebetween to allow said other upper portion to pivot about the pivot axis. When the gauge also includes the preferred embodiment of the indicator means, said other upper portion is allowed to pivot at least an amount sufficient to allow said part of the head to extend into the slot.

Another preferred feature is spring means which biases the second member downwardly. This biasing urges the second member into its use position when the tapered plug is wedged into the hole in the object.

According to a preferred aspect of the invention, the upper portion of the first member comprises a tubular portion defining a slideway. The attaching means comprises a slider member slidably received into the slideway. The second member comprises an elongated indicator arm and a substantially radially extending crosspiece. The crosspiece has radially opposite ends from which the lower portion of the second member depends downwardly. A radially center portion of the crosspiece is pivotably attached to the slider member to pivot about the pivot axis. The indicator arm extends upwardly from the crosspiece in the slideway. The tubular portion and the slider member each have a radial slot extending therethrough, to allow the crosspiece to extend radially therefrom and pivot relative thereto and to allow the crosspiece to slide axially relative to the tubular portion. Preferably, the spring means surrounds the tubular portion, and upper surface portions of the crosspiece form a spring abutment against which one end of the spring means is urged to urge the second member into its use position.

A preferred feature of the invention is a lower portion of the second member that comprises two legs, each of which depends downwardly from a different one of the opposite ends of the crosspeice and has a rounded bottom end surface. Inclusion of this feature has the advantage of making it possible to minimize the area of contact between the surface of the object around the hole and the gauge. The rounding of the bottom end surfaces of the legs reduces the area of contact to an absolute minimum of two point contacts. The minimization of the area of contact between the gauge and the surface of the object allows the gauge to be used to measure the angularity of holes in objects having either curved or flat surfaces. In addition, the restriction of the area of contact to essentially two point contacts eliminates any need for precisely machining relatively large areas of contact without sacrificing the accuracy of the gauge. This in turn simplifies and reduces cost of manufacturing the gauge.

Another preferred feature of the gauge is the provision of adapting means for varying the diameter of the plug to measure the angles of holes of varying sizes. Preferably, the adapting means comprises means for attaching a sleeve to the plug.

The gauge of the invention offers a number of advantages over known gauges and other apparatus for measuring the angularity of holes. The combination of a tapered plug, a sliding attachment between the two members, and spring biasing of one of the members into its use position makes it possible to easily and accurately measure the angularity of holes that are not precisely the same size and diameter but rather vary within certain tolerances. The tapering of the plug eliminates the need for precisely dimensioning the plug to each hole that is to be measured and allows the plug to be snugly received into any hole having a diameter within reasonable tolerances. The sliding attachment of the first and second members of the gauge and the spring biasing of one of the members automatically adapt the gauge to differing degrees of penetration of the plug into holes of different diameters. The gauge of the invention provides a single relatively simple and inexpensive tool that is easy to use and that does not require any special experience or training to use. In addition, the testing procedure is greatly facilitated by use of the gauge of the invention since only one quick and easy reading is required to test the angularity of each hole.

The general construction of the preferred embodiment of the invention is simple and relatively inexpensive. The gauge is easy to use and easy to maintain. In addition, the gauge is readily adaptable to measuring the angularity of holes of a wide range of diameters. The preferred embodiment of the indicator means is very simple in construction and allows a determination of whether the angularity is within tolerances to be made by simply glancing at the head of the indicator arm to see if it projects into the indicator slot. The preferred construction of the slider member, which includes an annular portion having a passageway therethrough, allows the slider member to have a sufficient axial length to avoid misalignments and/or inaccurate readings without interfering with the movement of the indicator arm and without necessitating any unwanted increase in the size of the gauge.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is an elevational view of the preferred embodiment of the invention, showing the plug in a hole that is accurately normal to the surface of the object.

FIG. 2 is like FIG. 1 except that parts of the gauge are shown in section and the plug is in a hole that deviates more than two degrees from normal to the surface of the object.

FIG. 3 is a fragmentary view of the bottom portion of FIG. 1 with a portion of the plug and its sleeve shown in section.

FIG. 4 is like FIG. 3 except that it shows a different size sleeve attached to the plug.

FIG. 5 is an exploded pictorial view of the preferred embodiment.

FIG. 6 is a top plan view of the slider taken along line 6—6 in FIG. 5.

FIG. 7 is a cross-sectional view taken along line 7—7 in FIG. 1, with the pivot pin and washers shown in plan.

FIG. 8 is a side elevational view of the guide taken along line 8—8 in FIG. 5.

BEST MODE FOR CARRYING OUT THE INVENTION

The drawings show a gauge 10 that is constructed according to the invention and that also constitutes the best mode of the invention currently known to the applicant. FIGS. 1-4 illustrate typical use situations for the gauge 10. In FIG. 1, the angularity of a hole 4 that passes inspection is being tested; in FIG. 2 the angularity of a hole 6 that fails inspection is being tested. FIGS. 1-4 show the testing of holes that extend all the way through a relatively thin object 2. It is of course to be understood that the gauge of the invention may also be used to test different types of holes in objects having different characteristics. For example, the gauge could be used for testing a hole that extends only part way through a relatively thick object. The preferred embodiment of the gauge 10 shown in the drawings is designed for testing holes that are supposed to be normal to the surface of the object. It is intended to be understood that the preferred embodiment may be modified to test holes having a desired angularity other than normal to the surface without departing from the spirit and scope of the invention. This could be done, for example, by orienting the plug 16 at an angle, by modifying the dimensions of the gauge 10, or by modifying the indicator means.

The preferred embodiment of the gauge 10 shown in the drawings includes a first member 12, 14 and a second member 42. These members 12, 14 and 42 are slidably and pivotably attached together. They slide with respect to each other along a line toward and away from their use positions, shown in FIGS. 1-4. They pivot with respect to each other about a pivot axis that is defined by a pivot pin 64 and is perpendicular to such line.

The first member includes two separate pieces 12, 14. One of these pieces, for convenience referred to herein as the plug piece 12, has a lower portion in the form of a downwardly tapered, essentially cylindrical plug 16. The plug 16 is dimensioned to fit holes of a particular size, for example holes of 3/16 inch diameter. The slight tapering of the plug 16 enables the plug 16 to be snugly received into any hole having a diameter that is within reasonable tolerances of 3/16 of an inch. Thus, normal variations in hole diameters are automatically compensated for and present no problem when hole angularity is measured by a gauge constructed according to the invention. The tapering of the plug 16 can cause some misalignment between the plug 16 and a hole being tested. However, the amount of tapering is just sufficient to allow the plug 16 to snugly fit any hole within given tolerances so that any such misalignment has no significant effect on the accuracy of the testing procedure.

The gauge 10 may easily be adapted to measure the angularity of larger holes. The adaptation is accomplished simply by increasing the diameter of the plug 16 by attaching a sleeve 20, 20' to the plug 16. Each adapter sleeve 20, 20' has an outer generally cylindrical surface having a slight taper of the same order of magnitude as the taper of the plug 16 and an inner generally cylindrical surface that fits closely around the plug 16. The plug 16 has a threaded axial hole 18 opening onto its bottom surface. A sleeve 20, 20' is simply slipped up over the plug 16, and a screw 22 is threaded into the hole 18. The head of the screw 22 abuts the bottom surfaces of both the plug 16 and the sleeve 20, 20' to hold the sleeve 20, 20' in place over the plug 16. The thickness of the sidewall of the sleeve 20, 20' may be varied considerably so that the gauge 10 may be used to test the angularity of holes of a wide range of sizes. The sleeve 20 shown in FIGS. 1-3 has a relatively thin sidewall and is dimensioned to be received into 5/16 inch holes. The sleeve 20' shown in FIG. 4 has a relatively thick sidewall and is dimensioned to be received into ½ inch holes.

The plug piece 12 of the first member 12, 14 of the preferred embodiment of the gauge 10 has, in addition to its lower plug portion 16, an upper tubular portion 24. This upper tubular portion 24, together with the sleeve piece 14 of the first member 12, 14, forms the upper portion 14, 24 of the first member 12, 14. The sleeve piece 14 is manufactured as a separate piece in order to allow the completed gauge 10 to be quickly and easily assembled and disassembled and in order to keep the construction of the gauge 10 relatively simple and the cost of its manufacture relatively inexpensive.

The upper tubular portion 24 of plug piece 12 has a radial slot 26 extending through its cylindrical sidewall from its open top end 32 to its closed bottom end 30. The cylindrical sleeve 14 is open at both ends and has a lower radial slot 34 extending therethrough adjacent to its lower end and an upper radial slot 36 extending therethrough adjacent to its top end 38. In the assembled gauge 10, the sleeve 14 is received into the tubular portion 24 of plug piece 12 with the bottom end of sleeve 14 resting against the top surface of the closed bottom 30 of tubular portion 24. The lower radial slot 34 in sleeve 14 is circumferentially aligned with the slot 26 in tubular portion 24 to form a radial slot 26, 34 through the upper portion 14, 24 of the first member 12, 14 of the gauge 10. This slot 26, 34 provides clearance for the second member 42, described below.

Sleeve 14 and tube 24 are held together by screws 78. A flange ring 74 fits snugly around the top end of tube 24 and has holes 76 extending radially therethrough for receiving the screws 78. Tube 24 has threaded holes 28 extending radially therethrough and aligned with holes 76 in ring 74. Sleeve 14 has on its outer cylindrical surface a dimple 40 that is aligned with one of the holes 28 in tube 24. One of the assembly screws 78 extends through a hole 76 in ring 74 and the aligned hole 28 in tube 24 and into dimple 40 in sleeve 14. The other screw 78 extends through ring 74 and tube 24 and is urged against sleeve 14. This arrangement holds tube 24 and sleeve 14 in position relative to each other. The additional functions of the flange ring 74 are discussed below.

The second member 42 of the preferred embodiment of the gauge 10 is flat and elongated. Member 42 has a lower portion 46 that is positioned radially outwardly from the plug 16 in the assembled gauge 10 and that has end surface means that contacts the surface of an object into which a hole extends when the angularity of the hole is being tested. Member 42 also has an upper portion, including an indicator arm 52, that cooperates with the upper portion 14, 24 of the first member 12, 14 to indicate whether or not the angle of the hole being tested is within permissible tolerances.

The configuration of member 42 is most clearly shown in FIGS. 2 and 5. The lower portion of member 42 includes two radially opposite legs 46 that depend downwardly from the opposite ends of a horizontal crosspiece 44. The bottom end surface 48 of each leg 46 is rounded to minimize the area of contact between the legs 46 and the surface of the object 2 and to permit each leg to pivot on the surface of the object 2 when the angularity of the hole being tested has a large deviation from the desired angularity. Such a hole 6 and the resulting positions of the legs 46 are illustrated in FIG. 2.

The indicator arm 52 of the second member 42 extends upwardly from the radially center portion of the crosspiece 44. The upper end of arm 52 has a radially extending head 54 that cooperates with radial slot 36 in sleeve 14 to indicate when the angularity of a hole is not within allowed tolerances. Just below the bottom of indicator arm 52, the radially center portion of crosspiece 44 has a hole 50 extending therethrough for receiving a pivot pin 64. Member 42 is pivotably mounted on a slider member 56 by means of pin 64. Slider 56 is closely and slidably received into the slideway 37 defined by sleeve piece 14 of the first member 12, 14. Since it is attached to slider 56, second member 42 slides with slider 56 in slideway 37 relative to first member 12, 14.

The construction of slider 56 is most clearly shown in FIGS. 5-7. Slider 56 is cylindrical and has a radial slot 60 extending therethrough and an axial passageway 58. The slot 60 extends through a lower portion of the slider 56 and opens onto its bottom surface. The passageway 58 extends through the top of slider 56 and down into the slider 56 to the top of the slot 60. The axial passageway 58 and the radial slot 60 communicate with each other at their interface but do not overlap each other. Slider 56 also has a radial hole 62 extending therethrough perpendicular to and intersecting slot 60.

When the gauge 10 is being assembled, the indicator arm 52 of second member 42 is moved upwardly into slider 56 through slot 60 and up into passageway 58 until crosspiece 44 is positioned within slot 60 and hole 50 in crosspiece 44 is aligned with and positioned between the two halves of hole 62 in slider 56. Preferably, washers 63 are positioned between crosspiece 44 and the walls of slot 60 in alignment with hole 50. Pivot pin 64 is placed into holes 62, 50 and through washers 63 to pivotably attach second member 42 to slider 56. The passageway 58 and the indicator arm 52 are dimensioned to provide clearance between the annular sidewall of the slider 56 that defines the passageway 58 and the indicator arm 52. This clearance allows the indicator arm 52 to pivot about the pivot axis defined by the pivot pin 64 at least an amount sufficient to allow a part of the head 54 of arm 52 to protrude from the tubular sleeve piece 14 through the upper indicator slot 36 when the angle of the hole being tested deviates from normal to the surface of the object by more than a predetermined amount. In the embodiment shown in the drawings, this amount is 2°.

The structure of the slider 56 could of course be varied considerably without departing from the spirit and scope of the invention. However, the construction of the slider 56 described above is preferred for a number of reasons. The radial slot 60 in the lower portion of the slider 56 is of course necessary to allow the crosspiece 44 to extend radially out from the slider 56 and pivot relative to slider 56. On the other hand, it is desirable to minimize the axial length of the slot 60 so that the bottom portion of the slider 56 has a maximum stiffness to prevent the two halves of such bottom portion from being squeezed against the crosspiece 44 when the pivot pin 64 is put into position. The annular configuration of the upper portion of the slider 56 helps to reduce the weight of the gauge 10 and also makes it possible to easily and relatively inexpensively manufacture the slider 56. The upper portion of the slider 56 must have an opening to provide the clearance necessary to allow indicator arm 52 to pivot. Providing such clearance by any means other than a cylindrical passageway would make the manufacture of the slider 56 extremely difficult if not impossible. The relatively long overall length of the slider 56 is necessary in order to insure a good friction free sliding fit between the slider 56 and the sleeve 14.

A guide member 66 is provided near the upper end of sleeve 14 to prevent the indicator arm 52 from wobbling and the head 54 of arm 52 from moving out of alignment with indicator slot 36. The tendency of the arm 52 to wobble is due to the cylindrical shape of passageway 58 and the impracticality of making the fit between pivot pin 64 and crosspiece 44 tight without interfering with the pivoting motion of crosspiece 44. Referring to FIGS. 2, 5, and 8, guide 66 is a short cylindrical member having a radial slot 68 extending therethrough adjacent to its top end to provide clearance for the head 54 of the indicator arm 52. An axial bore 70 opens onto the bottom end of guide 66 and extends upwardly into guide 66, overlapping slot 68, nearly to the top of guide 66. The top 72 of guide 66, through which the slot 68 extends, has a flat upper surface and a lower surface that tapers upwardly and radially inwardly from the sidewall of the bore 70. The sidewall of the bore 70 is very thin in order to minimize its effect on the pivoting of member 42.

As noted above, member 42 is biased downwardly relative to the first member 12, 14 of the gauge 10. The biasing is accomplished by a relatively large diameter thin wire spring 80. Spring 80 surrounds tubular portion 24 of plug piece 12 and sleeve 14. One end of spring 80 is urged against a spring abutment formed by the upper surface of crosspiece 44, and the other end of spring 80 is urged against flange ring 74, described above, which is attached to tubular portion 24.

The assembling of the gauge 10 can be carried out quickly and easily. Member 42 is attached to slider 56 by means of pivot pin 64, as described above. Guide 66 is press fit into sleeve 14. With guide 66 in place, indicator arm 52 and slider 56 are slipped up into sleeve 14 until the head 54 of indicator arm 52 projects up through slot 68 in guide 66. Tubular portion 24 of plug piece 12 is then placed up over sleeve 14 with crosspiece 44 being received into slot 26 in tubular portion 24. Spring 80 is then moved down over sleeve 14 and tubular portion 24 of plug piece 12. Spring 80 is compressed down against crosspiece 44 to allow flange ring 74 to be put in position over tubular portion 24. The threading of screws 78 into their respective holes and the release of spring 80 complete the assembly process.

The use of the gauge 10 is also quick and easy. First, the diameter of the plug 16 is adjusted, as necessary, to the size of the holes to be tested by attaching a sleeve 20, 20' to the plug 16 as described above. Then the plug 16 is pushed firmly into a hole to be tested until the plug 16 is wedged into the hole. With the plug 16 firmly wedged in its use position in the hole, the spring 80 automatically moves the second member 42 downwardly into its use position in which the rounded bottoms 48 of the legs 46 contact the surface of the object around the hole. While maintaining both the members 12, 14 and 42 in their use positions, the operator pivots the gauge 10 at least 90 degrees about a vertical axis. This is of course necessary since a hole might have an angularity in one direction but be perfectly normal to the surface in a perpendicular direction. While pivoting the gauge 10, the operator determines if at any point the head 54 of indicator arm 52 protrudes out from the indicator slot 36 in sleeve 14. This determination can be made by simply glancing at the gauge 10 or by feeling the edges of the slot 36. The latter method would generally be used in dimly lit test areas.

FIG. 1 illustrates the testing of a hole 4 in an object 2 that is nearly perfectly normal to the surface of the object 2. FIG. 2 illustrates the testing of a hole 6 that deviates from normal to the surface of the object 2 by considerably more than the allowable 2 degrees. The leg 46 at the right of FIG. 2 is not in contact with the surface of the object 2 because the deviation of the angularity of the hole 6 is so great that the limit of relative pivotal movement between members 12, 14 and 42 has been reached and indicator arm 52 is resting against the sidewall of guide 66. The parts of the gauge 10 could of course be differently dimensioned to provide for different allowable degrees of deviation.

Throughout the description of the structure and operation of the preferred embodiment of the gauge of the ivnention, the terms "lower", "upper", "downwardly", and the like have been used. These terms have been used for illustrative purposes only, illustrating the typical vertical use attitude of the gauge shown in the drawings. The terms are not intended to indicate that the use attitude of the gauge is limited to the vertical use attitude shown in the drawings, and it is intended to be understood that the gauge of the invention can be used to advantage in a wide range of situations and a wide range of use attitudes.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A gauge for measuring the deviation from a predetermined angle of the relative angle between a hole in an object and a surface of the object through which the hole extends, comprising:
    a first member including an upper portion, and a lower portion that includes a downwardly tapered plug dimensioned to be snugly receivable into the hole; and having a use position in which the plug is so received into the hole;
    a second member including an upper portion, and a lower portion positioned radially outwardly from the plug and having end surface means; said second member having a use position in which said end surface means contacts said surface of the object around the hole;
    attaching means for slidably and pivotably attaching said members together, to slide upwardly and downwardly with respect to each other along a line toward and away from said use positions, and to pivot with respect to each other about a pivot axis perpendicular to said line;
    spring means for biasing one of the members downwardly into said one member's use position when the other member is placed into said other member's use position; and
    indicator means, carried by said upper portions and responsive to relative pivotal movement between said upper portions, for indicating the amount of said deviation.

2. A gauge for measuring the deviation from a predetermined angle of the relative angle between a hole in an object and a surface of the object through which the hole extends, comprising:
    a first member including an upper portion, and a lower portion that includes a downwardly tapered plug dimensioned to be snugly receivable into the hole; and having a use position in which the plug is so received into the hole;
    a second member including an upper portion, and a lower portion positioned radially outwardly from the plug and having end surface means; said second member having a use position in which said end surface means contacts said surface of the object around the hole;
    attaching means for slidably and pivotably attaching said members together, to slide upwardly and downwardly with respect to each other along a line toward and away from said use positions, and to pivot with respect to each other about a pivot axis perpendicular to said line;
    spring means for biasing one of the members downwardly into said one member's use position when the other member is placed into said other member's use position; and
    indicator means carried by said upper portions for indicating the amount of said deviation;
    wherein one of said upper portions comprises a tubular portion defining a slideway, the attaching means comprises a slider member slidably received into said slideway, and the other of said upper portions is pivotably attached to the slider member to slide along and pivot in the slideway.

3. A gauge as described in claim 2, in which the indicator means comprises a radial slot extending through said tubular portion, and a radially extending head formed on the upper end of said other upper portion and axially and circumferentially aligned with said slot; said tubular portion, said other upper portion, said slot, and said head being dimensioned and positioned so that a part of said head protrudes radially from said tubular portion through said slot when said deviation is greater than a predetermined amount.

4. A gauge as described in claim 2, in which the slider member has an annular portion that defines an axial passageway, and said other upper portion extends upwardly from said pivot axis through said passageway; said other upper portion and said passageway being dimensioned to provide clearance therebetween to allow said other upper portion to pivot about said pivot axis.

5. A gauge as described in claim 3, in which the slider member has an annular portion that defines an axial passageway, and said other upper portion extends upwardly from said pivot axis through said passageway; said other upper portion and said passageway being dimensioned to provide clearance therebetween to allow said other upper portion to pivot about said pivot axis at least an amount sufficient to allow said part of said head to protrude from said tubular portion.

6. A gauge for measuring the deviation from a predetermined angle of the relative angle between a hole in an object and a surface of the object through which the hole extends, comprising:

a first member including an upper portion, and a lower portion that includes a downwardly tapered plug dimensioned to be snugly receivable into the hole; and having a use position in which the plug is so received into the hole;

a second member including an upper portion, and a lower portion positioned radially outwardly from the plug and having end surface means; said second member having a use position in which said end surface means contacts said surface of the object around the hole;

attaching means for slidably and pivotably attaching said members together, to slide upwardly and downwardly with respect to each other along a line toward and away from said use positions, and to pivot with respect to each other about a pivot axis perpendicular to said line;

spring means for biasing the second member downwardly to urge the second member into its use position when the first member is placed into said first member's use position and the tapered plug is wedged into the hole in the object; and indicator means carried by said upper portions for indicating the amount of said deviation.

7. A gauge for measuring the deviation from a predetermined angle of the relative angle between a hole in an object and a surface of the object through which the hole extends, comprising:

a first member including an upper portion, and a lower portion that includes a downwardly tapered plug dimensioned to be snugly receivable into the hole; and having a use position in which the plug is so received into the hole;

a second member including an upper portion, and a lower portion positioned radially outwardly from the plug and having end surface means; said second member having a use position in which said end surface means contacts said surface of the object around the hole;

attaching means for slidably and pivotably attaching said members together, to slide upwardly and downwardly with respect to each other along a line toward and away from said use positions, and to pivot with respect to each other about a pivot axis perpendicular to said line;

spring means for biasing one of the members downwardly into said one member's use position when the other member is placed into said other member's use position; and indicator means carried by said upper portions for indicating the amount of said deviation;

wherein the upper portion of the first member comprises a tubular portion defining a slideway; the attaching means comprises a slider member slidably received into said slideway; and the second member comprises an elongated indicator arm, and a substantially radially extending crosspiece having radially opposite ends from which said lower portion of the second member depends downwardly; a radially center portion of said crosspiece being pivotably attached to the slider member to pivot about said pivot axis; said indicator arm extending upwardly from said crosspiece in said slideway; and said tubular portion and said slider member each having a radial slot extending therethrough, to allow said crosspiece to extend radially therefrom and pivot relative thereto and to allow said crosspiece to slide axially relative to said tubular portion.

8. A gauge as described in claim 7, in which the spring means surrounds said tubular portion, and upper surface portions of the crosspiece form a spring abutment against which one end of the spring means is urged to urge the second member into its use position.

9. A gauge as described in claim 7, in which said lower portion of the second member comprises two legs, each of which depends downwardly from a different one of said opposite ends of the crosspiece and has a rounded bottom end surface.

10. A gauge as described in claim 9, in which the spring means surrounds said tubular portion, and upper surface portions of the crosspiece form a spring abutment against which one end of the spring means is urged to urge the second member into its use position.

11. A gauge as described in claim 7, in which the slider member has an annular portion that defines an axial passageway, said indicator arm extends upwardly through said passageway, and said passageway and indicator arm are dimensioned to provide clearance therebetween to allow said crosspiece and said indicator arm to pivot about said pivot axis.

12. A gauge as described in claim 7, in which the indicator means comprises a radial indicator slot extending through said tubular portion, and a radially extending head formed on the upper end of said indicator arm and axially and circumferentially aligned with said indicator slot; said tubular portion, said arm, said indicator slot, and said head being dimensioned and positioned so that a part of said head protrudes radially from said tubular portion through said indicator slot when said deviation is greater than a predetermined amount.

13. A gauge as described in claim 12, in which the slider member has an annular portion that defines an axial passageway, said arm extends upwardly through said passageway, and said arm and said passageway are dimensioned to provide clearance therebetween to allow said arm to pivot about said pivot axis at least an amount sufficient to allow said part of said head to protrude from said tubular portion.

14. A gauge as described in claim 12, in which the spring means surrounds said tubular portion, and upper surface portions of the crosspiece form a spring abutment against which one end of the spring means is urged to urge the second member into its use position.

15. A gauge as described in claim 14, in which said lower portion of the second member comprises two legs each of which depends downwardly from a different one of said opposite ends of the crosspiece and has a rounded bottom end surface.

16. A gauge as described in claim 1, in which the plug has adapting means for varying the diameter thereof to measure the angles of holes of varying sizes, said adapting means comprising means for attaching a sleeve to the plug.

17. A gauge as described in claim 1, in which said lower portion of the second member comprises two downwardly depending, radially spaced apart legs, each of which has a rounded bottom end surface, said legs being positioned to straddle a hole into which the plug has been received and to permit each leg to pivot on said surface of the object.

* * * * *